(12) United States Patent
Adzic et al.

(10) Patent No.: US 9,716,279 B2
(45) Date of Patent: Jul. 25, 2017

(54) CORE-SHELL FUEL CELL ELECTRODES

(71) Applicant: Brookhaven Science Associates, LLC, Upton, NY (US)

(72) Inventors: Radoslav Adzic, East Setauket, NY (US); Stoyan Bliznakov, South Setauket, NY (US); Miomir Vukmirovic, Port Jefferson Station, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 234 days.

(21) Appl. No.: 14/279,012

(22) Filed: May 15, 2014

(65) Prior Publication Data

US 2015/0017565 A1    Jan. 15, 2015

Related U.S. Application Data

(60) Provisional application No. 61/823,845, filed on May 15, 2013.

(51) Int. Cl.
| | |
|---|---|
| *H01M 4/86* | (2006.01) |
| *H01M 8/1004* | (2016.01) |
| *H01M 4/90* | (2006.01) |
| *H01M 4/92* | (2006.01) |

(Continued)

(52) U.S. Cl.
CPC ....... *H01M 4/8657* (2013.01); *H01M 4/8807* (2013.01); *H01M 4/8817* (2013.01); *H01M 4/9041* (2013.01); *H01M 4/92* (2013.01); *H01M 4/921* (2013.01); *H01M 8/1004* (2013.01); *H01M 2008/1095* (2013.01)

(58) Field of Classification Search
CPC ............ H01M 4/8657; H01M 8/1004; H01M 4/9041; H01M 4/92; H01M 4/921; H01M 4/8807; H01M 4/8817; H01M 2008/1095
See application file for complete search history.

(56) References Cited

U.S. PATENT DOCUMENTS

| | | |
|---|---|---|
| 6,670,301 B2 | 12/2003 | Adzic et al. |
| 6,749,892 B2 | 6/2004 | Chang |
| 6,783,569 B2 | 8/2004 | Cheon et al. |

(Continued)

OTHER PUBLICATIONS

Mukerjee, S., et al, "Role of Structural and Electronic Properties of Pt and Pt Alloys on Electrocatalysis of Oxygen Reduction" J. Electrochem. Soc., 142: 1409-1422 (1995).

(Continued)

*Primary Examiner* — Patrick Ryan
*Assistant Examiner* — Carmen Lyles-Irving
(74) *Attorney, Agent, or Firm* — Dorene M. Price; Lars O. Husebo (57) ABSTRACT

Embodiments of the disclosure relate to electrocatalysts. The electrocatalyst may include at least one gas-diffusion layer having a first side and a second side, and particle cores adhered to at least one of the first and second sides of the at least one gas-diffusion layer. The particle cores includes surfaces adhered to the at least one of the first and second sides of the at least one gas-diffusion layer and surfaces not in contact with the at least one gas-diffusion layer. Furthermore, a thin layer of catalytically atoms may be adhered to the surfaces of the particle cores not in contact with the at least one gas-diffusion layer.

14 Claims, 6 Drawing Sheets

(51) Int. Cl.
*H01M 4/88* (2006.01)
*H01M 8/1018* (2016.01)

(56) References Cited

U.S. PATENT DOCUMENTS

| | | | |
|---|---|---|---|
| 6,815,391 B2 | 11/2004 | Xing et al. | |
| 7,001,669 B2 | 2/2006 | Lu et al. | |
| 7,205,255 B2 | 4/2007 | Yamamoto | |
| 7,507,495 B2 | 3/2009 | Wang et al. | |
| 7,632,601 B2 | 12/2009 | Adzic et al. | |
| 7,691,780 B2 | 4/2010 | Adzic et al. | |
| 7,704,918 B2 | 4/2010 | Adzic et al. | |
| 2001/0002275 A1 | 5/2001 | Oldenburg et al. | |
| 2003/0068432 A1 | 4/2003 | Dai et al. | |
| 2003/0135971 A1 | 7/2003 | Liberman et al. | |
| 2004/0018414 A1 | 1/2004 | Adzic et al. | |
| 2004/0055419 A1 | 3/2004 | Kurihara et al. | |
| 2004/0131762 A1 | 7/2004 | Vigie et al. | |
| 2006/0070491 A1 | 4/2006 | Yang et al. | |
| 2006/0135359 A1 | 6/2006 | Adzic et al. | |
| 2006/0263675 A1 | 11/2006 | Adzic et al. | |
| 2007/0026292 A1 | 2/2007 | Adzic et al. | |
| 2007/0031722 A1 | 2/2007 | Adzic et al. | |
| 2007/0264189 A1 | 11/2007 | Adzic et al. | |
| 2008/0128284 A1 | 6/2008 | Penner et al. | |
| 2009/0068505 A1 | 3/2009 | Adzic et al. | |
| 2010/0097742 A1 | 4/2010 | Adzic et al. | |
| 2010/0099012 A1 | 4/2010 | Adzic | |
| 2010/0177462 A1 | 7/2010 | Adzic et al. | |
| 2010/0197490 A1* | 8/2010 | Adzic | B82Y 30/00 502/326 |
| 2010/0216632 A1 | 8/2010 | Adzic et al. | |
| 2011/0151356 A1 | 6/2011 | Adzic et al. | |
| 2011/0155579 A1 | 6/2011 | Wang et al. | |
| 2012/0245017 A1 | 9/2012 | Adzic et al. | |
| 2012/0245019 A1 | 9/2012 | Adzic et al. | |
| 2012/0251926 A1* | 10/2012 | Shirvanian | H01M 4/8642 429/530 |
| 2012/0301809 A1* | 11/2012 | Mitsuta | H01M 4/8657 429/481 |
| 2013/0034803 A1 | 2/2013 | Adzic et al. | |
| 2013/0045328 A1 | 2/2013 | Adzic et al. | |
| 2013/0056359 A1 | 3/2013 | Adzic et al. | |
| 2013/0177715 A1 | 7/2013 | Adzic et al. | |
| 2013/0177838 A1 | 7/2013 | Wang et al. | |
| 2013/0178357 A1 | 7/2013 | Adzic et al. | |
| 2013/0264198 A1 | 10/2013 | Wang | |
| 2013/0281285 A1 | 10/2013 | Kotaro et al. | |

OTHER PUBLICATIONS

Brankovic, S.R., et al. "Metal Monolayer Deposition by Replacement of Metal Adlayers on Electrode Surfaces," Surf. Sci., 474, L173 (2001).

Zhang, J., et al. "Platinum Monolayer Electrocatalysts for O2 Reduction: Pt Monolayer on Pd(111) and on Carbon-Supported Pd Nanoparticles," J. Phys. Chem. B 108, 10955 (2004).

Zhang, J., et al., "Controlling the catalytic activity of platinum-monolayer electrocatalysts for oxygen reduction with different substrates," Angew. Chem. Int, 44, 2132 (2005).

Zhang, J., et al., "Platinum monolayer on nonnoble metal-noble metal core-shell nanoparticle electrocatalysts for O2 reduction," J. Phys. Chem. B. 109, 22701 (2005), and 1 page of Supporting Information.

Zhang, J., et al., "Stabilization of platinum oxygen-reduction electrocatalysts using gold clusters," Science, 315, 220, 220 (2007), and 9 pages of Supporting Online Material.

* cited by examiner

*Fig. 8*

CORE-SHELL FUEL CELL ELECTRODES

CROSS-REFERENCE TO A RELATED APPLICATION

This application claims the benefit under 35 U.S.C. 119(e) of U.S. Provisional Application No. 63/823,845 filed on May 15, 2013, the content of which is incorporated herein in its entirety.

This invention was made with Government support under contract number DE-AC02-98CH10886 awarded by the U.S. Department of Energy. The Government has certain rights in the invention.

FIELD OF THE INVENTION

This disclosure relates generally to electrocatalysts, more specifically to electrocatalysts for use in polymer electrolyte membrane fuel cells.

BACKGROUND

A fuel cell is an electrochemical device capable of converting the chemical energy of a fuel and an oxidant into electrical energy. A standard fuel cell is comprised of an anode and cathode separated by a conducting electrolyte which electrically insulates the electrodes yet permits the flow of ions between them. The fuel cell operates by separating electrons and ions from the fuel at the anode and transporting the electrons through an external circuit to the cathode. The ions are concurrently transported through the electrolyte to the cathode where the oxidant is combined with the ions and electrons to form a waste product. An electrical circuit is completed by the concomitant flow of ions from the anode to cathode via the conducting electrolyte and the flow of electrons from the anode to the cathode via the external circuit.

In particular, polymer electrolyte membrane fuel cells (PEMFCs) may be of interest. PEMFCs may eliminate electrolyte leakage lower corrosion, simplify stack design and increase ruggedness. Producing PEMFCs may require complex procedures, such as powder catalyst production, ink preparation from catalyst powder, and spreading the ink on a gas diffusion layer. Furthermore, as PEMFCs may require platinum (Pt) catalyst as an active material of electrodes, it may be beneficial to increase the reaction sites in the catalytic layer and, thus, to improve electrode performance and reduce Pt loading. Therefore there is a need to develop methods that increase the reaction sites in the catalytic layer while at the same time reduce the Pt loading.

SUMMARY OF THE INVENTION

Embodiments of invention provide for electrocatalysts that have increased reaction sites in the catalytic layer while at the same time have reduced the catalytic metal loading. These electrocatalysts may be used in polymer electrolyte membrane fuel cells (PEMFC).

An embodiment provides for an electrocatalyst which includes at least one gas-diffusion layer having a first side and a second side and particle cores adhered to at least the first side of the at least one gas-diffusion layer. The particle cores include a first surface area adhered to the first side of the at least one gas-diffusion layer and a second surface area not in contact with the at least one gas-diffusion layer. A than layer of catalytically active metal atoms is adhered to the second surface area of the particle cores not in contact with the at least one gas-diffusion layer.

An embodiment provides for a membrane electrode assembly which includes at least one gas-diffusion layer having a first side and a second side and particle cores adhered to at least the first side of the at least one gas-diffusion layer. The particle cores include a first surface area adhered to the first side of the at least one gas-diffusion layer and a second surface area not in contact with the at least one gas-diffusion layer. A thin layer of catalytically active metal atoms is adhered to the second surface area of the particle cores not in contact with the at least one gas-diffusion layer. At least one proton exchange membrane is attached to at least the first side of the at least one gas-diffusion layer.

Another embodiment provides for a method of forming a membrane electrode assembly. The method includes treating at least one gas-diffusion layer to at least partially oxidize at least one surface of the least one gas-diffusion layer, depositing core particles on the at least one surface of the least, one gas-diffusion layer, and depositing a thin layer of catalytically active metal atoms on a surface area of the core particles not in contact with the at least one surface of the least one gas-diffusion layer.

DETAILED DESCRIPTION

Embodiments described in this disclosure include electrocatalysts that have increased reaction sites in the catalytic layer while at the same time have reduced the catalytic metal loading. These electrocatalysts may be used in polymer electrolyte membrane fuel cells (PEMFC)

Figure 1:
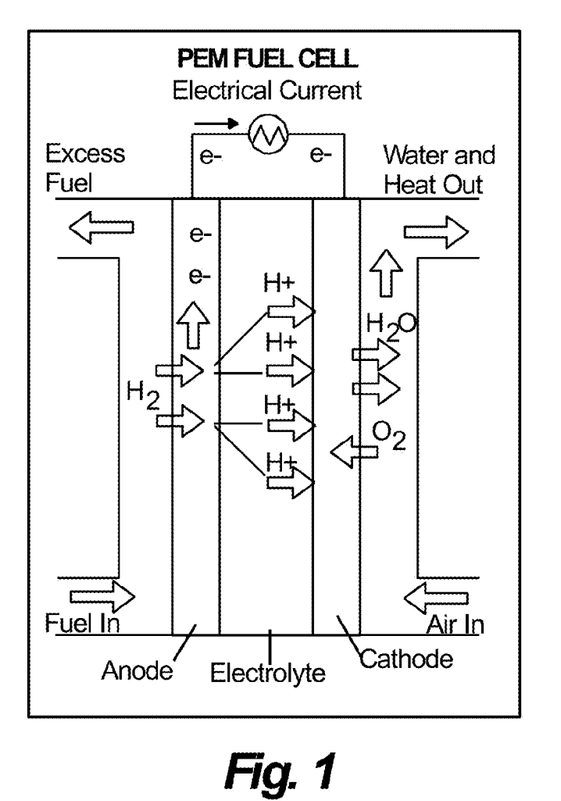
FIG. 1 is a diagram of a polymer electrolyte membrane fuel cell (PEMFC)

FIG. 1 is a diagram of PEMFC. A proton exchange membrane fuel cell transforms the chemical energy liberated during the electrochemical reaction of hydrogen and oxygen to electrical energy, as opposed to the direct combustion of hydrogen and oxygen gas to produce thermal energy.

A stream of hydrogen is delivered to the anode side the membrane electrode assembly (MEA). At the anode side it is catalytically split into protons and electrons. (http://en.wikipedia.org/wiki/Proton_exchange_membrane_fuel_cell, last accessed May 15, 2013) This oxidation half-cell reaction or Hydrogen Oxidation Reaction (HOR) is represented by:

At the Anode:

$$H_2 \rightarrow 2H^+ + 2e^- \quad E°=0V \quad (1)$$

The newly formed protons permeate through the polymer electrolyte membrane to the cathode side. The electrons travel along an external load circuit to the cathode side of the MEA, thus creating the current output of the fuel cell. Meanwhile, a stream of oxygen is delivered to the cathode side of the MEA. At the cathode side oxygen molecules react with the protons permeating through the polymer electrolyte membrane and the electrons arriving through the external circuit to form water molecules. This reduction half-cell reaction or oxygen reduction reaction (ORR) is represented by:

At the Cathode:

$$1/2 O_2 + 2H^+ + 2e^- \rightarrow H_2O \quad E°=1.229V \quad (2)$$

Overall Reaction:

$$H_2 + 1/2 O_2 \rightarrow H_2O \quad E°=1.229V \quad (3)$$

The reversible reaction is expressed in the equation and shows the reincorporation of the hydrogen protons and electrons together with the oxygen molecule and the formation of one water molecule.

Disclosed herein is a MEA that may be formed with an increase in reaction sites in the catalytic layer while at the same time reducing the catalytic metal loading. The MEA may be formed by first providing a gas diffusion layer (GDL). The gas diffusion layer may be constructed of known materials. They may be formed of a porous material including a conducting material such as carbon. For example, porous carbon woven fabric provides efficient transport of fuel gas or oxidant gas into the catalyst layers.

At least one surface of the GDL may be treated to at least partially oxide the carbon surface of the GDL. The GDL may be treated with an acid. Any suitable acid may be used, such as nitric acid or sulfuric acid.

Core particles may be formed on the partially oxidized GDL surface. Any suitable method of forming core particles may be deployed. For example the methods of forming core nanoparticles described in U.S. Patent Publication Nos. US 20100197490 A1, 20100216632 A1, US 20110155579 A1, and in U.S. Pat. No. 7,691,780 B2, U.S. Pat. No. 7,704,918 B2, and U.S. Pat. No. 7,855,021 B2, all incorporated herein by reference in their entirety, may be used. Furthermore, core nanoparticles may be formed as described in U.S. patent application Ser. No. 13/860,316 filed Apr. 10, 2013, titled Synthesis of Nanoparticles Using Ethanol, U.S. Publication No. 2013/0264198, the contents of which is incorporated herein in its entirety.

Figure 3:
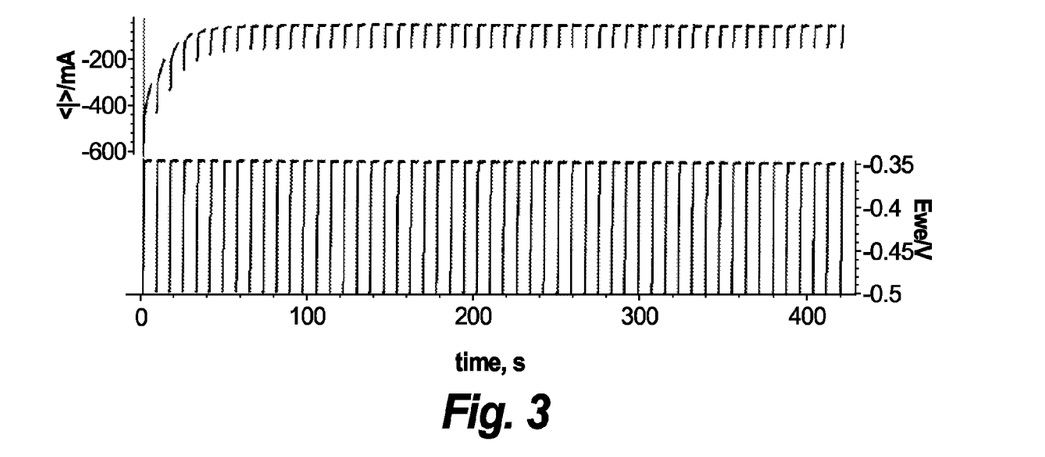
FIG. 3 is a plot of the pulse deposition protocol for PdAu alloy core deposition on GDL.

The core particles may, for example, be deposited using electrodeposition of metal salt solutions of the metals to be deposited directly on the GDL. Any suitable metal salt solutions may be used. For example metal salts of at least one noble metal such as ruthenium, rhodium, palladium, silver, rhenium, osmium, iridium, platinum, gold may be used. Furthermore, metal salts of non-noble metals, such as Ti, Hf, Zr, W, Ta, Nb, V, Re, Cr, Mo, Tc, and Mn, may also be used. Combinations of noble metal salts and non-noble metal salts may also be used. The metal salts may be chlorides, carbonates, acetates, citrates, fluorides, nitrates, nitrites, phosphates, sulfates, or combinations thereof, of the metal ions. FIG. 3 shows a pulse deposition protocol for PdAu alloy core deposition on GDL, 0.5 seconds at −500 mV, 4.5 seconds at −350 mV, 3 seconds at open circuit potential. In certain embodiments the electrolyte composition can include 1 mM $PdCl_2$+0.1 M NaCl+0.1 mM NaAuCl.

The core particle may include at least one noble metal, such as ruthenium (Ru), rhodium (Rh), palladium (Pd), silver (Ag), rhenium (Re), osmium (Os), iridium (Ir), platinum (Pt), and gold (Au). In other embodiments the core particle may include at least one non-noble metal. In certain embodiments the core particle includes Ti, Hf, Zr, W, Ta, Nb, V, Re, Cr, Mo, Tc, and Mn. Alternatively, the core particle may include at least an alloy of at least two noble metals, or at least one noble metal and at least one non-noble metal.

In certain embodiments the core particle comprises an alloy selected from the group consisting of $Pd_{1-x}Au_x$, $Pd_{1-x}Ti_x$, $Pd_{1-x}W_x$, $Pd_{1-x}Nb_x$, $Pd_{1-x}Ta_x$, $Pd_{1-x}Re_x$, $Pd_{1-x}Ir_x$, $Ir_{1-x}Ti_x$, $Ir_{1-x}Ta_x$, $Ir_{1-x}Nb_x$, $Ir_{1-x}Re_x$, $Au_{1-x}Ta_x$, $Au_{1-x}Ir_x$, and $Au_{1-x}Re_x$ and x represents the concentration of the alloying element, being adjustable over the range 0<x<1. In one embodiment the alloy is PdAu.

The particles disclosed and described in this specification are not limited to any particular shape or size, but in some embodiments may be nanoparticles with sizes ranging from 1 to 100 nm in one more dimensions. However, the size is not so limited and may extend into the micrometer and millimeter size range. The shape may be spherical or spheroidal, but again is not so limited. Throughout this specification, the particles will be primarily disclosed and described as essentially spherical nanoparticles. It is to be understood, however, that the particles may take on any shape, size, and structure as is well-known in the art. This includes, but is not limited to branching, conical, pyramidal, cubical, mesh, fiber, cuboctahedral, and tubular nanoparticles. The nanoparticles may be agglomerated or dispersed, formed into ordered arrays, fabricated into an interconnected mesh structure, either formed on a supporting medium or suspended in a solution, an may have even or uneven size distributions. The particle shape and size is preferably configured so that the bonding configuration of surface atoms is such that their reactivity and, hence, their ability to function as a catalyst is increased.

Core particle formation is followed by the deposition of a catalytically active surface layer (or shell) having thicknesses in the monolayer-to-multilayer range.

Figure 2A:
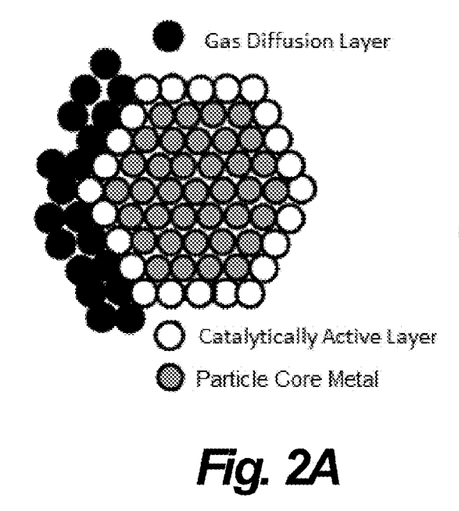
FIG. 2A is an illustration of a Pt-encapsulated nanoparticle attached to a gas-diffusion layer with Pt atoms in contact with carbon that are not accessible to protons
Figure 2B:
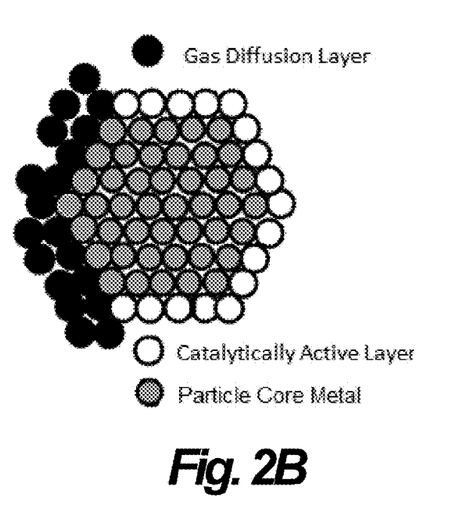
FIG. 2B is an illustration of Pt-encapsulated nanoparticle attached to a gas-diffusion layer with all Pt atoms accessible to protons.

The deposition of catalytically active surface layer takes place on the surface areas of the core particle that are not adhered or attached to the GDL. FIG. 2A illustrates core particles that have a thin layer of a catalytically active metal wholly surrounding the particle. Thus, there are catalytically active metal atoms sandwiched between the core particles and the GDL that are not accessible to protons and therefore are "inactive" atoms. However, FIG. 2B, illustrates an embodiment of the present disclosure. It can be seen that the core particle is encapsulated by the GDL and the catalytically active surface layer, and all the catalytically active metal atoms of the shell is available to interact with the protons (i.e., active).

For purposes of this specification, a monolayer (ML) is formed when the surface of a substrate (or core), not in contact with the GDL, is fully covered by a single, closely packed layer comprising adatoms of a second material which forms a chemical or physical bond with atoms at the surface of the substrate. The surface is considered fully covered when substantially all available surface sites, not in contact with the GDL, are occupied by an adatom of the second material. If the surface of the substrate is not completely covered by a single layer of the adsorbing material, then the surface coverage is considered to be submonolayer. However, if a second or subsequent layers of the adsorbant are deposited onto the first layer, then multilayer surface coverages (e.g., bilayer, trilayer, etc.) result.

The catalytically active surface layer may be deposited using any of a wide variety of thin film deposition processes which are well-known in the art.

For example catalytically active surface layer may be deposited as described in U.S. Publication No. 2013/0264198.

A synthetic procedure which employs the principles of electrodeposition and galvanic displacement has been utilized by Brankovic, et al. (hereinafter "Brankovic") to deposit a monolayer of Pt onto Au(111) substrates and by Adzic, et al. (hereinafter "Adzic") to deposit Pt monolayers onto Pd(111) and carbon-supported Pd nanoparticles. These procedures are described, for example, in "Metal Monolayer Deposition By Replacement Of Metal Adlayers On Electrode Surfaces," Surf. Sci., 474, L173 (2001) and U.S. Pat. No. 7,691,780, respectively. This process has also been described in detail by J. Zhang, et al. in "Platinum Monolayer Electrocatalysts for $O_2$ Reduction: Pt Monolayer On Pd(111) And On Carbon-Supported Pd Nanoparticles," J. Phys. Chem. B 108, 10955 (2004). Each of the aforementioned references is incorporated by reference as if fully set forth in this specification.

The deposition process is a series of electrochemical reactions which, when performed sequentially result in a film with the targeted coverage and composition. The procedure involves the initial formation of an adlayer of a metal onto a substrate by underpotential deposition (UPD). This is followed by the galvanic displacement of the adlayer by a more noble metal, resulting in the conformal depositon of a ML of the more noble metal on the substrate. The overall process includes the irreversible and spontaneous redox displacement of an adlayer of a non-noble metal by a more noble metal. This enables the controlled deposition of a thin, continuous layer of a desired metal. In the process the substrate metal is more noble than the metal undergoing deposition in order to avoid becoming oxidized. The redox reaction can be described by the following equation $$M_{UPD}^0 + (m/z)L^{z+} \Rightarrow M^{m+} + (m/z)L^0 \qquad (1)$$

where $M_{UPD}^0$ represents a UPD metal adatom on the electrode surface and $L^{z+}$ is a noble metal cation with positive charge z+ and valence z. The $M^{m+}$ represents the metal cation in the solution obtained after the UPD adatom was oxidized, and $L^0$ is a noble atom deposited in the redox process.

Although the catalytically active surface layer is not limited to any particular material, it is preferably Pt due to its excellent catalytic properties. Consequently, an example in which a monolayer of Pt is formed on nanoparticles using the processes described by Brankovic and Adzic will now be described in detail. It is to be understood, however, that the process is not limited to Pt and other noble metals may be utilized. The method involves the initial formation of a monolayer of a metal such as copper (Cu) by underpotential deposition (UPD) in it solution comprised of 50 mM $CuSO_4$ in a 50 mM $H_2SO_4$ solution. The Cu-coated nanoparticles are then immersed from solution and rinsed with deionized water to remove $Cu^{2+}$ ions from the surface. This is followed by immersion in a solution comprised of 1.0 mM $K_2PtCl_4$ in 50 mM $H_2SO_4$ under a $N_2$ atmosphere for approximately two minutes to replace all Cu atoms with Pt atoms. The Pt-coated nanoparticle substrate is again rinsed with deionized water. The above processes are carried out in a multi-compartment cell under a $N_2$ atmosphere in order to prevent Cu oxidation by $O_2$ during sample transfer.

The above process results in the conformal deposition of a ML of Pt on high-surface-area core particles. The deposition cycle comprising UPD of Cu followed by galvanic displacement with Pt may be repeated as needed to produce two or more layers of Pt in order to ensure complete coverage of the nanoparticle surface. Conversely, the UPD of Cu may be controllably limited such that submonolayer coverages of Cu and, hence, Pt are obtained. Deposition of an initial adlayer by UPD may also be accomplished using metals other than Cu such as, for example, lead (Pb), bismuth (Bi), tin (Sn), cadmium (Cd), silver (Ag), antimony (Sb), and thallium (Tl). The choice of metal used for UPD will influence the final Pt surface coverage obtained for a given UPD adlayer. This occurs due to variations in the size and valency among the different metals. The metal overlayer used is not limited to Pt, but may be formed from other noble metals as long as the desired metal is more noble than the UPD adlayer. This may be accomplished by contacting the copper-coated particles with their corresponding salts. For example, monolayers of iridium, ruthenium, osmium, and rhenium can be deposited by displacement of a ML of a less noble metal such as copper using $IrCl_3$, $RuCl_3$, $OsCl_3$, or $ReCl_3$, respectively. Furthermore, the metal overlayer may be formed as an alloy with any number of constituents such as binary, ternary, quaternary, or quinary alloys with experimentally optimized stoichiometry ratios.

The process offers unprecedented control over film growth and is advantageous in terms of its versatility, reproducibility, and efficient utilization of source material. Since a costly precious metal such as Pt can be utilized as a thin film instead of in bulk form, significant cost savings can be attained. The utilization of a noble metal/substrate nanoparticle may also provide unexpectedly heightened catalytic activity due to synergistic effects between the nanoparticles and the catalytic overlayer. The unexpected increase in catalytic activity may arise due to electronic and geometric effects which arise from the formation of surface metal-metal bonds and the differing lattice constants of the catalytic overlayer and underlying substrate.

The catalytic properties of the surface overlayer may also be engineered by use of suitable core particle. A core of a non-noble metal such as Ni, Co, Fe, Ti, W, Nb, V, or Ta may be coated with a more noble metal such as Au, Pd, or Pt. The catalytic activity of the final coated nanoparticle may be controlled by engineering the electronic properties and lattice parameter of the underlying core-shell nanoparticles with respect to those of the metal overlayer.

The GDL with the cores having atomically thin surface layers deposited thereon in Situ, may then be contacted with a proton exchange membrane (PEM) such that the cores having atomically thin surface layers are sandwiched between the GDL and the PEM. Any suitable PEM may be used, such as for example Nafion membranes. An anode layer may be contacted with the second surface (the surface not in contact with the core particles and PEM). This assembly may then be hot-pressed together to form the membrane electrode assembly (MEA).

By electrodeposition of cores onto the GDL and then adding the atomic layers (such as for example a Pt monolayer) to form the shell, there are no shell atoms trapped by other atoms or trapped between the core and the GDL, and they are thus accessible to reactant gas, electrons, and protons. Thus, 100% utilization of the shell atoms can be achieved. Furthermore, the methods described herein amounts to in situ catalyst deposition directly onto the GDL and fabrication of the MEA can be performed in mere minutes (e.g., several minutes), and without the need to prepare catalyst ink and paint the catalyst ink onto the GDL. Furthermore, as the particles are formed in-situ and on the GDL, there is less opportunity for exposure to free nanoparticles or for nanoparticles to be released into the environment.

EXAMPLES

Membrane Electrode Assembly (MEA)

MEAs prepared by first cutting gas diffusion layers (GDLs) into 5 cm$^2$, 25 cm$^2$, or 450 cm$^2$ pieces. The GDLs were then functionalized by pretreatment in hot (70° C.) concentrated nitric acid for 1 hour followed by thorough rinsing with nanopure water, boiling in water for 1 hour, and rinsing again with nanopure water. Nanoparticles were then deposited or sprayed onto the treated GDLs, and the nanoparticles coated with a Pt layer according to the methods described below. The GDLs with the Pt coated nanoparticles was rinsed with nanopure water and dried. A Nafion 211 membrane was then hot-pressed to the GDL together with an anode electrode to complete the MEA fabrication.

Examples 1A-1C, $Pt_{ML}PdAu$, 5 cm$^2$, 25 cm$^2$, or 450 cm$^2$

PdAu Core deposition: Elongated $Pd_{0.9}Au_{0.1}$ nanoparticles with an average particle size of 6 nm were electrodeposited directly on the GDL (Example 1A: 5 cm$^2$, Example 1B: 25 cm$^2$, Example 1C: 450 cm$^2$) at constant potential (−330 mV vs. Ag/AgC/Cl$^-$ (3M KCl)). The electrolyte composition was 1 mM $PdCl_2$+0.1 M NaCl+0.1 mM $NaAuCl_4$ and the loading of the $Pd_{0.9}Au_{0.1}$ nanoparticles was controlled by the charge and was limited to 30 μg/cm$^2$.

Pt monolayer coating: Pt monolayer shell deposition on the $Pd_{0.9}Au_{0.1}$ nanoparticle cores was performed as described in U.S. Pat. No. 7,691,780. First a Cu underpotentially deposited (UPD) monolayer was deposited at underpotentials from 50 mM $CuSO_4$+50 nM $H_2SO_4$ solution. Then the electrolyte was replaced with 1 mM $KPtCl_4$+50 mM $H_2SO_4$ solution and the pre-deposited Cu ML was galvanically displaced by Pt for less than a minute. There were no changes observed in the shape and the particle size distribution of the resulting $Pt_{ML}Pd_{0.9}Au_{0.1}$ electrocatalysts. The shape and the average particle size distribution remained the same as of the $Pd_{0.9}Au_{0.1}$ nanoparticles core.

Example 2, $Pt_{ML}Pd_{hollow}$ 5 cm$^2$ $Pd_{hollow}$ core deposition: Hollow palladium nanoparticles made using a micro-emulsion method were combined with Vulcan XC-72R carbon black and water to obtain a palladium catalyst ink loading of about 30 wt % total palladium. The ink was then sprayed onto the GDL (5 cm$^2$) and dried.

Pt monolayer coating: Pt monolayer shell deposition on the $Pd_{hollow}$ nanoparticle cores was performed as described for Examples 1A-1C. There were no changes observed in the shape and the particle size distribution of the resulting $Pt_{ML}Pd_{hollow}$ electrocatalysts. The shape and the average particle size distribution remained the same as of the $Pd_{hollow}$ nanoparticles core.

Examples 3A and 3B, $Pt_{ML}Pd_{nanowires}$ 5 cm$^2$ and 25 cm$^2$ $Pd_{nanowires}$ Core deposition: $Pd_{nanowires}$ with diameter of 3-4 nm and length of 50-60 nm were electrodeposited directly on functionalized GDL (Example 3A: 5 cm$^2$, Example 3B: 25 cm$^2$) at constant potential (−330 mV vs. Ag/AgC/Cl$^-$ (3M KCl)). The electrolyte composition was 1 mM $PdCl_2$+0.1 M NaCl and the load of the $Pd_{nanowires}$ was controlled by the charge and was limited to 30 μg/cm$^2$.

Pt monolayer coating: Pt monolayer shell deposition on the $Pd_{nanowires}$ nanoparticle cores was performed as described for Examples 1A-1C. There were no changes observed in the shape and the particle size distribution of the resulting $Pt_{ML}/Pd_{nanowires}$ electrocatalyst. The shape and the average particle size distribution remained the same as of the $Pt_{ML}Pd_{nanowires}$ nanoparticles core.

Examples 4A and 4B, $Pt_{ML}PdWNi$ 5 cm$^2$ and 25 cm$^2$

PdWNi Core deposition: The deposition of the PdWNi nanocrystalline core was performed directly on functionalized GDL (Example 4A: 5 cm$^2$, Example 4B: 25 cm$^2$) in two steps. In the first step refractory WNi alloy were co-electrodeposited in a solution of 0.05 M $NiSO_4$+0.4 M $Na_2WO_4$+0.6 M trisodium citrate (pH=7.5) at constant current density of 15 mA/cm$^2$. The obtained deposits were very fine composite amorphous-nanocrystilline microstructure with an average particle size distribution of 3 nm and 1:1 atomic ratio between W and Ni. After finishing the deposition step, the electrolyte was replaced by 1 mM $PdCl_2$+50 mM $H_2CO_4$ solution, and parts of the Ni atoms from the alloy were galvanically displaced by Pd. As a result a Pd reach shell was formed on the WNi core, and the particle size distribution remained unchanged.

Pt monolayer coating: Pt monolayer shell deposition on the PdWNi nanoparticle cores was performed as described for Examples 1A-1C. There were no changes observed in the shape and the particle size distribution of the resulting $Pt_{ML}PdWNi$ electrocatalysts. The shape and the average particle size distribution remained the same as of the $Pt_{ML}Pd_{nanowires}$ nanoparticles core.

Example 5, $Pt_{ML}Pd$ 5 cm$^2$

Pd core deposition: Palladium nanoparticles made in ethanol using the method as described in U.S. Publication No. 2013/0264198, were combined with Vulcan XC-72R carbon black and water to obtain a palladium catalyst ink loading of about 30 wt % total palladium. The ink was then sprayed onto the GDL (5 cm$^2$) and dried.

Pt monolayer coating: Pt monolayer shell deposition on the Pd nanoparticle cores was performed as described for Examples 1A-1C. There were no changes observed in the shape and the particle size distribution of the resulting $Pt_{ML}Pd$ electrocatalysts. The shape and the average particle size distribution remained the same as of the Pd nanoparticles core.

Results

Figure 4:
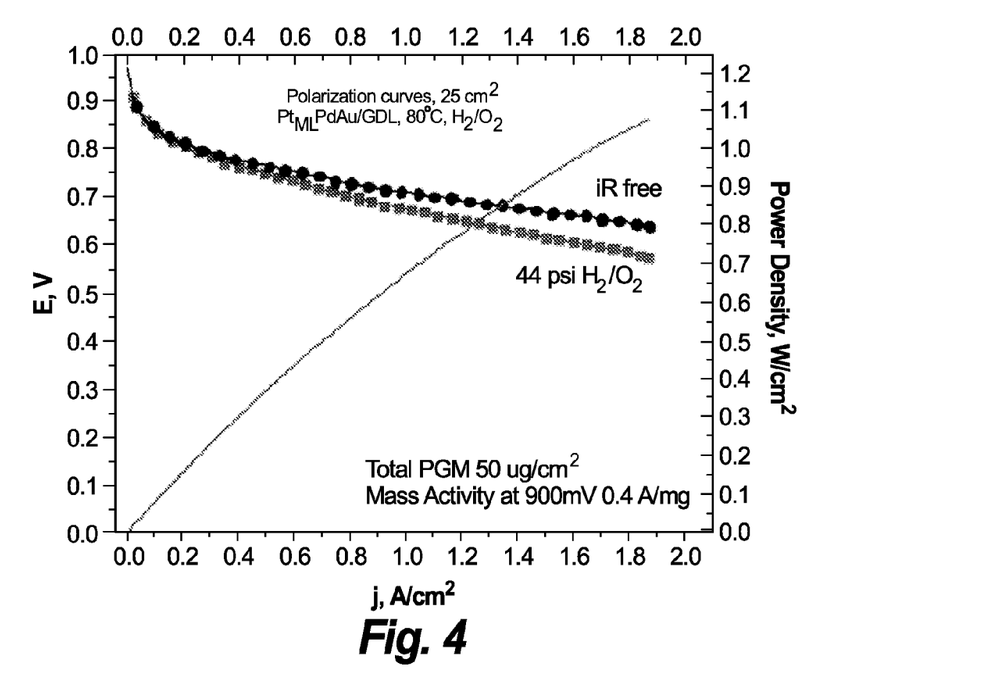
FIG. 4 shows polarization curves of Example 1B ($Pt_{ML}PdAu$, 25 cm$^2$) in a single $H_2/O_2$ cell.

FIG. 4 shows polarization curves of Example 1B in a single $H_2/O_2$ cell with only 50 μg/cm$^2$ of all platinum-group metals on the cathode as compared to 400 μg/cm$^2$ in commercial Pt catalysts. The PGM mass activity is 0.4 A/mg, the specific activity is 0.2 mA/cm$^2$, and the Pt mass activity is 1.1 A/mg$_{Pt}$.

Figure 5:
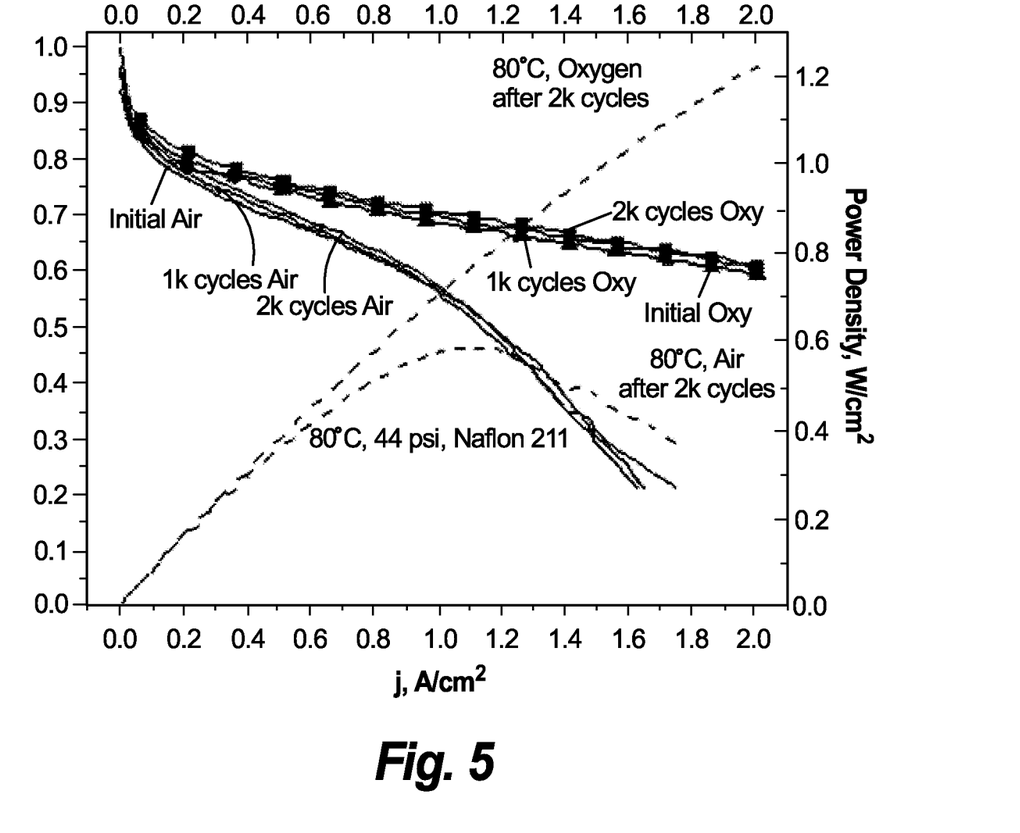
FIG. 5 shows polarization curves of Example 1A ($Pt_{ML}PdAu$, 5 cm$^2$) in air or oxygen, and after 1000 and 2000 cycles.

FIG. 5 shows polarization curves of Example 1A in air or oxygen, and after 1000 and 2000 cycles. After 2000 potential cycles it can be seen that the activity increased. The PGM mass activity is 0.5 A/mg, the specific activity is 0.4 mA/cm$^2$, and the Pt mass activity is 1.2 A/mg$_{Pt}$.

Figure 6:
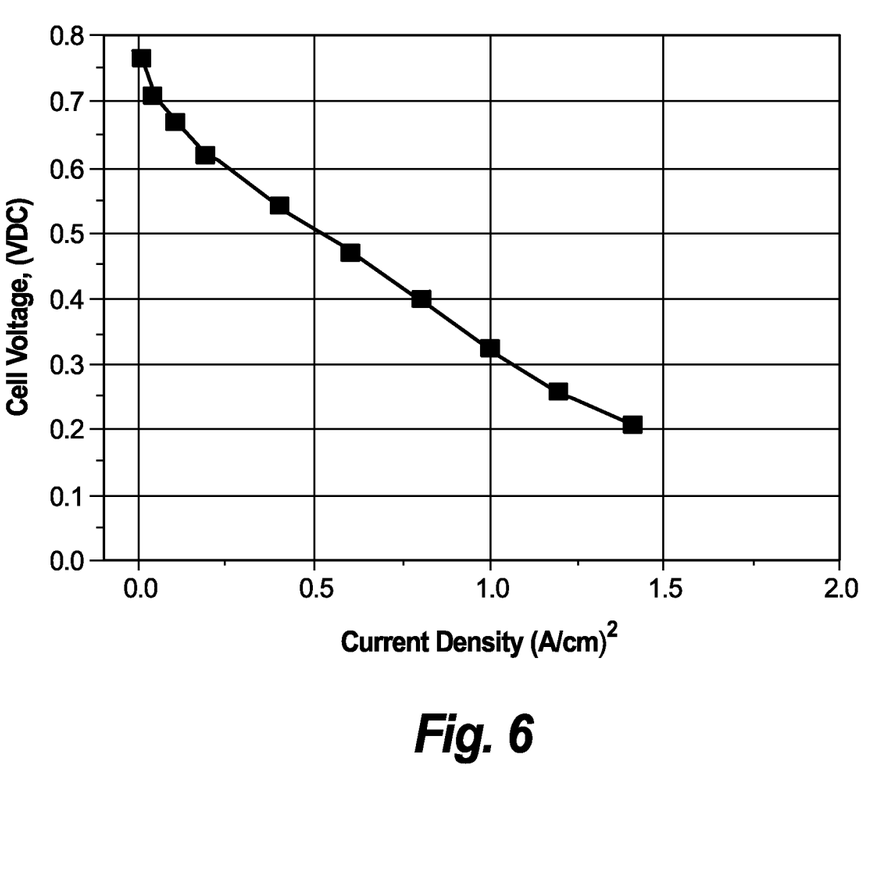
FIG. 6 shows the polarization curve of Example 1C ($Pt_{ML}PdAu$, 450 cm$^2$)

FIG. 6 shows the polarization curve of Example 1C. It can be seen that Examples 1A and 1B (5 and 25 cm$^2$ electrodes, respectively) show a similar activity, while Example 1A (450 cm$^2$ electrode) shows a lower activity. This may be caused by the ambient pressure applied and low open circuit potential which may be due to the state of the surface. However, this may be corrected. Example 1C has a PGM mass activity is 0.4 A/mg and a Pt mass activity of 1 A/mg$_{Pt}$.

Figure 7:
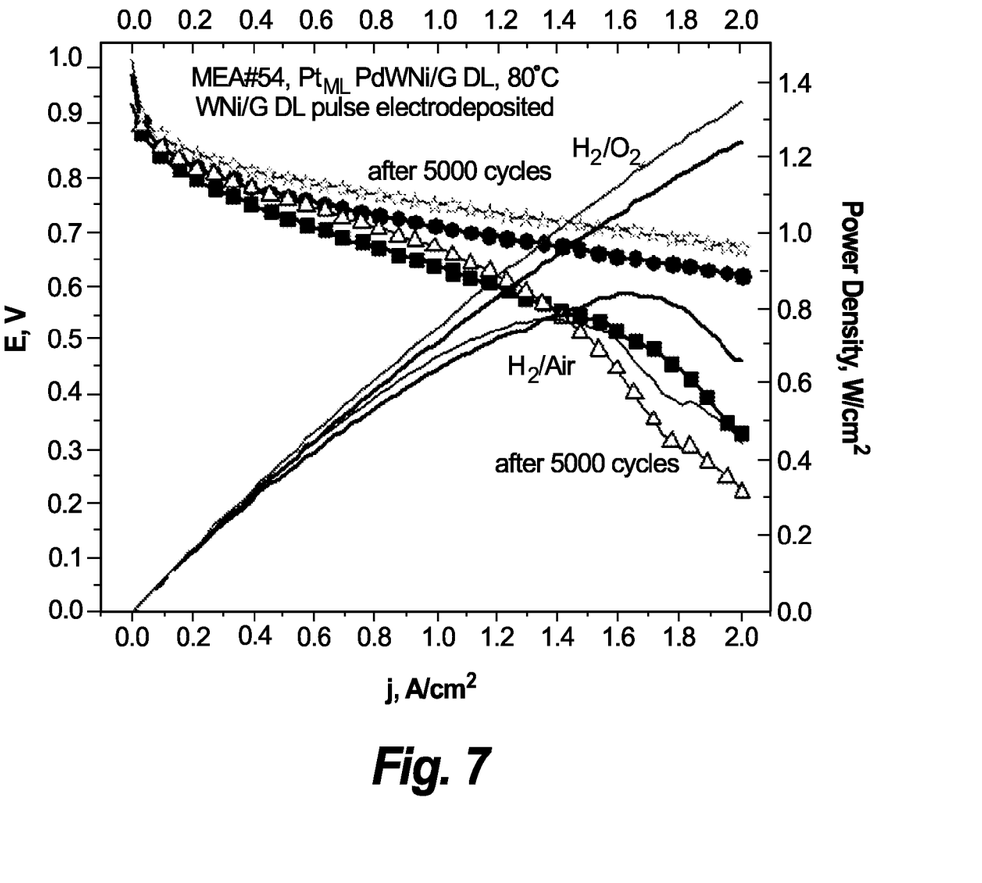
FIG. 7 shows the polarization curve of Example 4A ($Pt_{ML}PdWNi$ 5 cm$^2$)
Figure 8:
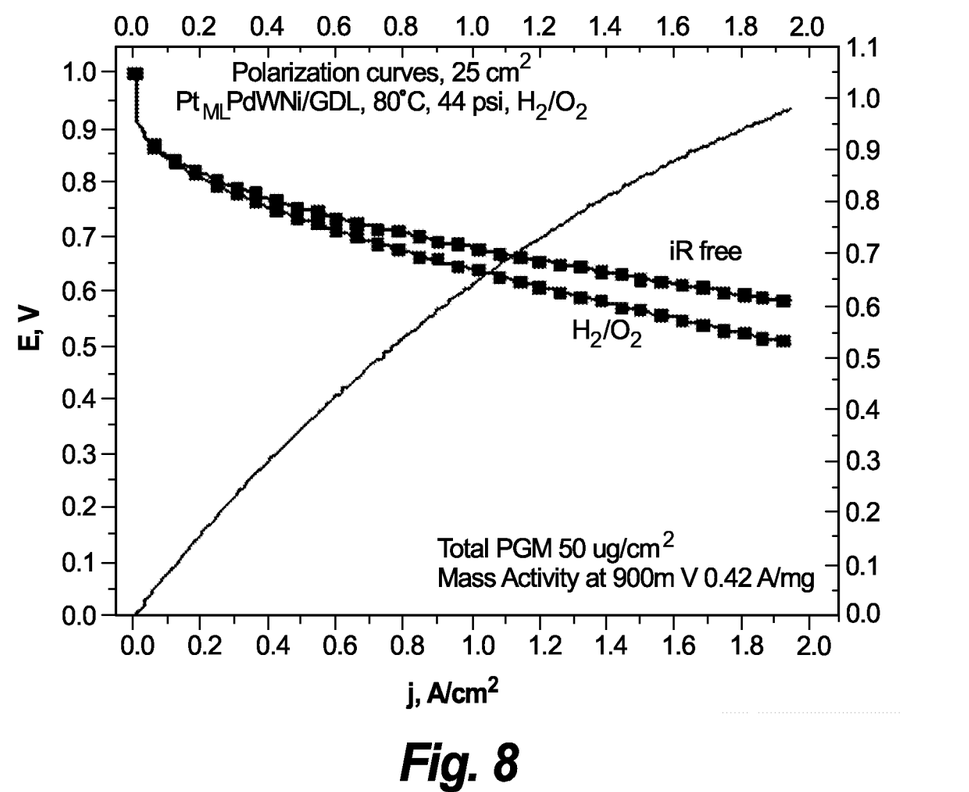
FIG. 8 shows the polarization curve of Example 4B ($Pt_{ML}PdWNi$ 25 cm$^2$).

FIG. 7 shows the polarization curve of Example 4A and FIG. 8 shows the polarization curve of Example 4B. It can be seen that the performance increased after 5000 cycles for Example 4A (5 cm$^2$) and after 15,000 cycles for Example 4B (25 cm$^2$), Table 1 shows a summary of the results for the 5 cm$^2$ MEA examples herein compared to a MEA made using commercially available Pt/C materials. It can be seen that all the example Pt catalysts have a PGM activity 3-5 times higher than the commercially available catalyst, and their Pt mass activity is one order of magnitude higher than that of the commercially available catalyst. The only exception is lower PGM activity for the Pt$_{ML}$Pd$_{nanowires}$ catalyst caused by the mass of Pd wire.

TABLE 1

|  | Specific activity mA/cm2 (at 0.9 v) | Pt mass activity A/mg$_{Pt}$ (at 0.9 v) | PGM mass activity, a/mg$_{pgm}$ (at 0.9 v) |
| --- | --- | --- | --- |
| Example 1A | 0.4 | 1.2 | 0.5 |
| Example 2 | 1.4 | 1.2 | 0.5 |
| Example 3A | 0.7 | 1.7 | 0.1 |
| Example 4A | 0.3 | 1.3 | 0.5 |
| Example 5 | 1.3 | 0.9 | 0.4 |
| Commercial Pt/C | 0.15-0.2 | 0.1-0.12 | 0.1-0.12 |

The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. Patents, and U.S. Patent Application Publications cited throughout this specification are incorporated by reference as if fully set forth in this specification.

The invention claimed is:

1. An electrocatalyst comprising:
   at least one gas-diffusion layer having a first side and a second side;
   particle cores directly adhered to at least the first side of the at least one gas-diffusion layer, wherein the particle cores include a first surface area adhered to the first side of the at least one gas-diffusion layer and a second surface area not in contact with the at least one gas-diffusion layer; and
   a thin layer of catalytically active metal atoms adhered to the second surface area of the particle cores not in contact with the at least one gas-diffusion layer, and not adhered in-between the first surface area of the particle cores and the first side of the at least one gas-diffusion layer.

2. The electrocatalyst of claim 1, wherein the particle core comprises a noble metal selected from at least one of ruthenium (Ru), rhodium (Rh), palladium (Pd), silver (Ag), rhenium (Re), osmium (Os), iridium (Ir), platinum (Pt), and gold (Au).

3. The electrocatalyst of claim 2, wherein the particle core further comprises a non-noble metal.

4. The electrocatalyst of claim 1, wherein the thin layer of catalytically active metal atoms comprises noble metals.

5. The electrocatalyst of claim 4, wherein the thin layer of catalytically active metal atoms is one to three monolayers thick.

6. The electrocatalyst of claim 5, wherein the thin layer of catalytically active metal atoms comprises platinum (Pt).

7. The electrocatalyst of claim 1 wherein the particle core is a nanoparticle having dimensions of 1 to 100 nm along three orthogonal directions.

8. The electrocatalyst of claim 1, wherein the particle core comprises an alloy.

9. The electrocatalyst of claim 2, wherein the particle core comprises at least two different noble metals selected from ruthenium (Ru), rhodium (Rh), palladium (Pd), silver (Ag), rhenium (Re), osmium (Os), iridium (Ir), platinum (Pt), and gold (Au).

10. The electrocatalyst of claim 1, wherein the particle core comprises an element selected from the group consisting of Ti, Hf, Zr, W, Ta, Nb, V, Re, Cr, Mo, Tc, and Mn.

11. The electrocatalyst of claim 1, wherein the particle core comprises at least one metal selected from the group comprising tungsten (W), molybdenum (Mo), and rhenium (Re), and at least one metal selected from group comprising nickel (Ni), iron (Fe), and cobalt (Co).

12. The electrocatalyst of claim 11, wherein the thin layer of catalytically active metal atoms comprises palladium (Pd), gold (Au), or platinum (Pt).

13. The electrocatalyst of claim 11, further comprising a shell layer between the second surface area of the particle core not in contact with the at least one gas-diffusion layer and the thin layer of catalytically active metal atoms, wherein the shell comprises at least one metal selected from the group comprising palladium (Pd) and gold (Au), and wherein the thin layer of catalytically active metal atoms comprises platinum (Pt).

14. The electrocatalyst of claim 13, wherein the core comprises tungsten (W) and nickel (Ni), and the shell comprises palladium (Pd).

* * * * *